(12) United States Patent
Cherrillo et al.

(10) Patent No.: US 8,876,923 B2
(45) Date of Patent: Nov. 4, 2014

(54) FUEL COMPOSITIONS

(75) Inventors: Ralph Anthony Cherrillo, Houston, TX (US); Mary Ann Dahlstrom, Katy, TX (US); Edward Carl Nelson, Katy, TX (US)

(73) Assignee: Shell Oil Company, Houston, TX (US)

( * ) Notice: Subject to any disclaimer, the term of this patent is extended or adjusted under 35 U.S.C. 154(b) by 358 days.

(21) Appl. No.: 13/053,414

(22) Filed: Mar. 22, 2011

(65) Prior Publication Data

US 2011/0232169 A1  Sep. 29, 2011

Related U.S. Application Data

(60) Provisional application No. 61/316,615, filed on Mar. 23, 2010.

(51) Int. Cl.
*C10L 1/19* (2006.01)
*C10L 1/02* (2006.01)
*C10L 1/16* (2006.01)

(52) U.S. Cl.
CPC ............... *C10L 1/026* (2013.01); *C10L 1/1683* (2013.01); *C10L 1/19* (2013.01); *Y02E 50/13* (2013.01); *C10G 2300/1014* (2013.01); *C10G 2300/1022* (2013.01); *C10G 2300/1055* (2013.01); *C10G 2300/1059* (2013.01); *C10G 2300/202* (2013.01); *C10G 2300/301* (2013.01)
USPC .......................................................... 44/388

(58) Field of Classification Search
CPC ....................................................... C10L 1/19
USPC .................... 44/307, 394, 437, 388
See application file for complete search history.

(56) References Cited

U.S. PATENT DOCUMENTS

| 4,125,566 | A | 11/1978 | Trin Dinh et al. | 260/676 R |
| 4,478,955 | A | 10/1984 | Pesa et al. | 518/713 |
| 6,204,426 | B1 | 3/2001 | Miller et al. | 585/739 |
| 6,215,034 | B1 | 4/2001 | Oomori et al. | 585/14 |
| 6,419,715 | B1 | 7/2002 | Jones et al. | 44/443 |
| 6,458,176 | B2 | 10/2002 | Yeh et al. | 44/437 |
| 6,767,373 | B2 | 7/2004 | Jones et al. | 44/443 |
| 7,189,265 | B2 | 3/2007 | Said et al. | 8/405 |
| 2006/0096161 | A1* | 5/2006 | Connor et al. | 44/437 |
| 2006/0201056 | A1* | 9/2006 | Jordan | 44/307 |
| 2010/0236139 | A1* | 9/2010 | Jackson | 44/394 |

FOREIGN PATENT DOCUMENTS

| EP | 0147240 | 7/1985 | C10L 1/22 |
| EP | 0147873 | 7/1985 | C07C 1/04 |
| EP | 0482253 | 4/1992 | C10L 1/22 |
| EP | 0557516 | 4/1993 | C10L 1/22 |
| EP | 0583836 | 2/1994 | C10L 65/12 |
| EP | 0613938 | 9/1994 | C10L 1/22 |

(Continued)

*Primary Examiner* — Prem C Singh
*Assistant Examiner* — Chantel Graham

(57) ABSTRACT

A fuel composition having an enhanced thermal stability in a diesel fuel application is provided comprising a base fuel containing:
(a) 90 to 50% by volume based on the base fuel, of a petroleum refined diesel fuel having sulfur level of less than 500 ppm, and boiling point within the range of about 150 to about 400° C.;
(b) 5 to 25% by volume based on the base fuel, a Fischer-Tropsch derived gas oil; and
(c) 5 to 25% by volume based on the base fuel, a fatty acid alkyl ester having C18:2 to C18:1 ratio of 1.5 to 2.8 wherein the alkyl group has a carbon number from 1 to 4.

21 Claims, 1 Drawing Sheet

(56) References Cited

FOREIGN PATENT DOCUMENTS

| | | | |
|---|---|---|---|
| EP | 1101813 | 5/2011 | ............. C10G 47/14 |
| GB | 960493 | 6/1964 | |
| GB | 2077289 | 6/1980 | ................ C07C 1/04 |
| WO | WO9306194 | 4/1993 | ................ C10L 1/22 |
| WO | WO9714768 | 4/1997 | ................ C10L 1/02 |
| WO | WO9714769 | 4/1997 | ................ C10L 1/02 |
| WO | WO9842808 | 10/1998 | ................ C10L 1/22 |
| WO | WO0011116 | 3/2000 | ................ C10L 1/04 |
| WO | WO0011117 | 3/2000 | ................ C10L 1/08 |
| WO | WO0020534 | 4/2000 | ................ C10L 1/08 |
| WO | WO0020535 | 4/2000 | ................ C10L 1/08 |
| WO | WO0183406 | 11/2001 | ................ C07C 1/00 |
| WO | WO0183641 | 11/2001 | |
| WO | WO0183647 | 11/2001 | |
| WO | WO0183648 | 11/2001 | |

\* cited by examiner

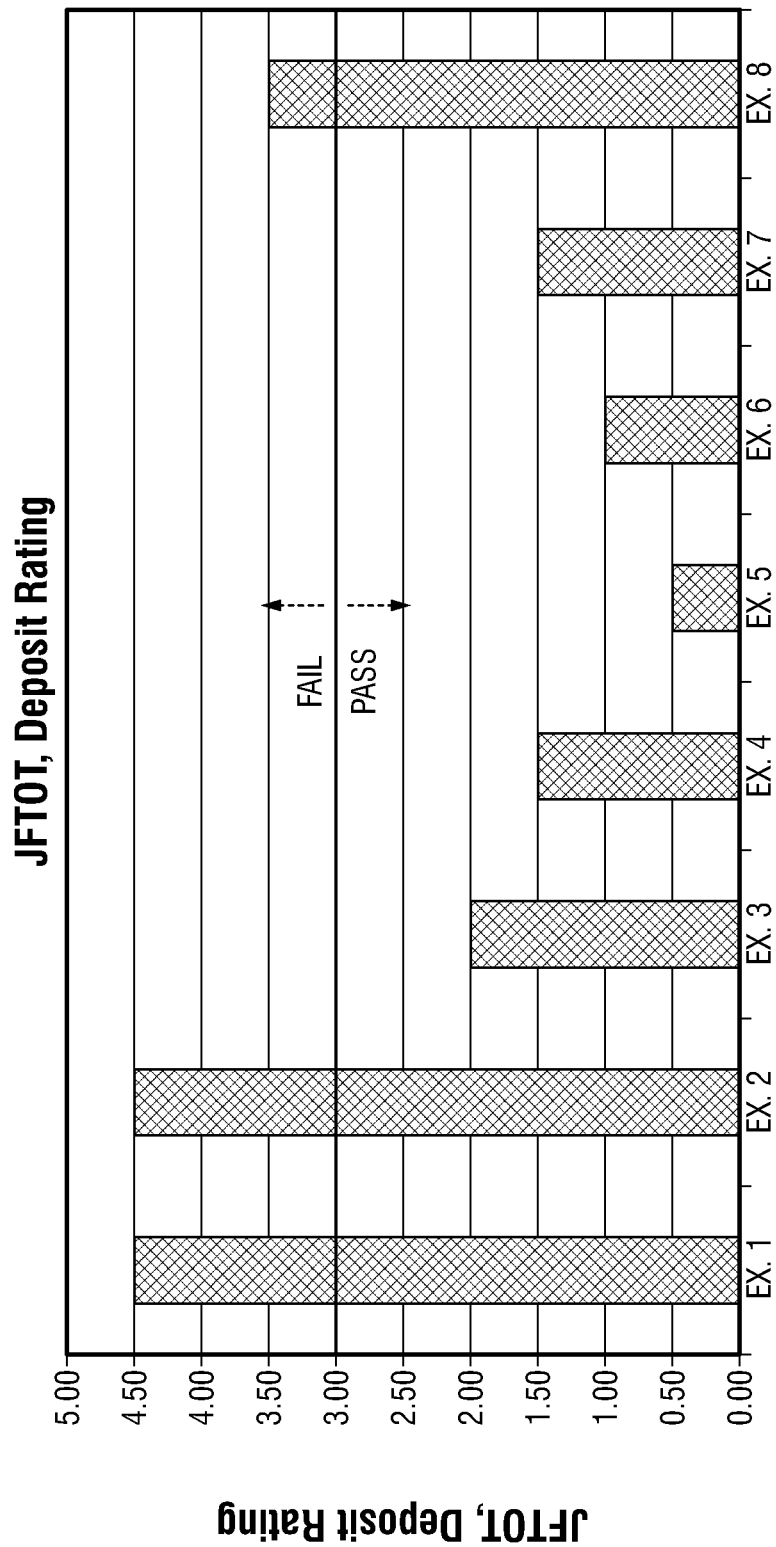

FUEL COMPOSITIONS

This application claims the benefit of Provisional Application No. 61/316,615 filed Mar. 23, 2010, which is incorporated herein by reference.

FIELD OF THE INVENTION

This invention relates to diesel fuel compositions, to their preparation and their uses.

BACKGROUND OF THE INVENTION

Typical diesel fuels comprise liquid hydrocarbon middle distillate fuel oils having boiling points from about 150 to 400° C.

However, hydrocarbon fuels are subject to oxidative decomposition during storage and use. The decomposition products frequently appear as fuel insoluble deposits. During the use of these fuels deposits may "plate out" onto solid surfaces or may be filtered out by in-line filters. Deposits on solid surfaces can impact fuel flow through a nozzle or other control device. In aviation applications, a nozzle containing deposits can even result in engine failure. Deposits can also act as insulators and reduce heat transfer through a conductive metal surface in a device such as a heat exchanger. In aviation applications, fuels are used to cool lubricant and hydraulic streams, so deposits may reduce the effectiveness and efficiency of these systems.

There is also interest in renewable and oil-alternative fuels. Specifications for such biodiesel products B100 (ASTM D6751 and EN-14214) as well as B6-B20 biodiesel blends (ASTM D7467) have been written, but the storage life and other concerns with the blended B20 products have hindered wide acceptance in the industry.

SUMMARY OF THE INVENTION

Accordingly, one embodiment of the invention, a fuel composition is provided comprising a base fuel consisting essentially of
  (a) 90 to 50% by volume based on the base fuel, of a petroleum refined diesel fuel having sulfur level of less than 500 ppm (parts per million, μg/g), and boiling point within the range of about 150 to about 400° C.;
  (b) 5 to 25% by volume based on the base fuel, a Fischer-Tropsch derived gas oil; and
  (c) 5 to 25% by volume based on the base fuel, a fatty acid alkyl ester having C18:2 to C18:1 ratio of 1.5 to 2.8 wherein the alkyl group has a carbon number from 1 to 4.

In another embodiment of the invention, a method of blending such fuel composition and its use in operating a compression ignition engine is provided.

BRIEF DESCRIPTION OF THE DRAWING

FIG. 1 represents the JFTOT deposit ratings from the Examples.

DETAILED DESCRIPTION OF THE INVENTION

It has now been found that certain blends of components (a), (b) and (c) provide enhanced thermal stability in a diesel fuel application. Thermal stability can be measured using test method ASTM Designation: D 3241-02, the standard test method for thermal oxidative stability by JFTOT procedure.

In the base fuel, small or negligible amounts of materials that do not change the properties or the thermal stability of the fuel composition may be present, but the base fuel preferably is composed of components (a), (b) and (c).

The fuel compositions comprise a base fuel containing petroleum refined diesel fuel component (a) having sulfur level of less than 500 ppm, and boiling point within the range of about 150 to about 400° C. The petroleum refined diesel fuel component (a) may be any low or ultra low sulfur diesel fuel suitable for operating a diesel engine having the above-referenced characteristics. In the present embodiment, it is understood that the definition of petroleum refined diesel fuel component does not include the Fischer-Tropsch derived gas oil component (b).

Suitable petroleum refined diesel fuels typically have an initial distillation temperature of about 160° C. and a final distillation temperature of from about 290 to about 360° C., depending on grade and use. Suitable petroleum refined diesel fuels include commercially available diesel fuels. Commercially available petroleum refined diesel fuels include, for example, No. 1 S500 or S15 diesel fuels, No. 2 S500 or S15 diesel fuels, and ultra low or zero sulfur diesel fuels (ULSD or ZSD).

The petroleum refined diesel fuel preferably contains no more than 500 ppmw of sulfur, and more preferably is an ultra low sulfur fuel containing 15 ppmw or less of sulfur, or a zero sulfur diesel fuel containing 10 ppmw or less of sulfur or even a sulfur free diesel fuel.

The petroleum refined diesel fuel will typically have a density from about 0.75 to about 0.9 g/cm$^3$, preferably from about 0.80 to about 0.86 g/cm$^3$ at 15° C. (e.g., ASTM D4502 or IP 365) and a cetane number (ASTM D613) of from 35 to 80, more preferably from 40 to 75. It will typically have an initial boiling point in the range about 150 to 230° C. and a final boiling point in the range about 290 to 400° C. Its kinematic viscosity at 40° C. (ASTM D445) might suitably be from about 1.5 to about 4.5 mm$^2$/s. An example of a suitable diesel fuel can be found in U.S. Pat. Nos. 6,458,176; 6,767,373; 6,419,715; and 6,215,034 which disclosure are hereby incorporated by reference.

The petroleum refined diesel fuel may itself comprise a mixture of two or more different petroleum refined diesel fuel components, and/or be additivated as described below.

The petroleum refined diesel fuel (a) may also be an industrial gas oil which may comprise fuel fractions such as the kerosene or gas oil fractions obtained in traditional refinery processes, which upgrade crude petroleum feedstock to useful products. Preferably such fractions contain components having carbon numbers in the range 7-40, more preferably 7-31, yet more preferably 8-25, most preferably 9-25, and such fractions have a density at 15° C. of 650-950 kg/L, a kinematic viscosity at 40° C. of 1.0-4.5 mm$^2$/s, and a boiling range of 150-400° C.

For diesel fuel applications, the Fischer-Tropsch derived gas oil (b) should be suitable for use as a diesel fuel. Its components (or the majority, for instance 95% w/w or greater, thereof) should therefore have boiling points within the typical diesel fuel ("gas oil") range, i.e. from about 150 to about 400° C. or from 170 to 370° C. It will suitably have a 90% w/w distillation temperature of from 282 to 338° C.

By "Fischer-Tropsch derived" is meant that the fuel is, or derives from, a synthesis product of a Fischer-Tropsch condensation process. The Fischer-Tropsch reaction converts carbon monoxide and hydrogen into longer chain, usually paraffinic, hydrocarbons:

$n(CO+2H_2) = (-CH_2-)_n + nH_2O + \text{heat},$ in the presence of an appropriate catalyst and typically at elevated temperatures (e.g., 125 to 300° C., preferably 175 to 250° C.) and/or pressures (e.g., 5 to 100 bar, preferably 12 to 50 bar). Hydrogen:carbon monoxide ratios other than 2:1 may be employed if desired.

The carbon monoxide and hydrogen may themselves be derived from organic or inorganic, natural or synthetic sources, typically either from natural gas or from organically derived methane.

A gas oil product may be obtained directly from the Fischer-Tropsch reaction, or indirectly for instance by fractionation of a Fischer-Tropsch synthesis product or from a hydrotreated Fischer-Tropsch synthesis product. Hydrotreatment can involve hydrocracking to adjust the boiling range (see, e.g. GB-B-2077289 and EP-A-0147873) and/or hydroisomerisation which can improve cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired gas oil fraction(s) may subsequently be isolated for instance by distillation.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. No. 4,125,566 and U.S. Pat. No. 4,478,955, which disclosures are hereby incorporated by reference.

Typical catalysts for the Fischer-Tropsch synthesis of paraffinic hydrocarbons comprise, as the catalytically active component, a metal from Group VIII of the periodic table, in particular ruthenium, iron, cobalt or nickel. Suitable such catalysts are described for instance in EP-A-0583836 (pages 3 and 4).

An example of a Fischer-Tropsch based process is the SMDS (Shell Middle Distillate Synthesis) described in "The Shell Middle Distillate Synthesis Process", van der Burgt et al (supra). This process (also sometimes referred to as the Shell™ "Gas-to-Liquids" or "GtL" technology) produces middle distillate range products by conversion of a natural gas (primarily methane) derived synthesis gas into a heavy long-chain hydrocarbon (paraffin) wax which can then be hydroconverted and fractionated to produce liquid transport fuels such as the gas oils useable in diesel fuel compositions. A version of the SMDS process, utilizing a fixed-bed reactor for the catalytic conversion step, is currently in use in Bintulu, Malaysia and its products have been blended with petroleum derived gas oils in commercially available automotive fuels.

Gas oils prepared by the SMDS process are commercially available for instance from the Royal Dutch/Shell Group of Companies. Further examples of Fischer-Tropsch derived gas oils are described in EP-A-0583836, EP-A-1101813, WO-A-97/14768, WO-A-97/14769, WO-A-00/20534, WO-A-00/20535, WO-A-00/11116, WO-A-00/11117, WO-A-01/83406, WO-A-01/83641, WO-A-01/83647, WO-A-01/83648 and U.S. Pat. No. 6,204,426 which disclosure is hereby incorporated by reference.

Suitably, in accordance with the present invention, the Fischer-Tropsch derived gas oil will consist of at least 70% w/w, preferably at least 80% w/w, more preferably at least 90% w/w, most preferably at least 95% w/w, of paraffinic components, preferably iso- and linear paraffins. The weight ratio of iso-paraffins to normal paraffins will suitably be greater than 0.3 and may be up to 12; suitably it is from 1 to 9. The actual value for this ratio will be determined, in part, by the hydroconversion process used to prepare the gas oil from the Fischer-Tropsch synthesis product. Some cyclic paraffins may also be present.

By virtue of the Fischer-Tropsch process, a Fischer-Tropsch derived gas oil has essentially no, or undetectable levels of, sulfur and nitrogen. Compounds containing these heteroatoms tend to act as poisons for Fischer-Tropsch catalysts and are therefore removed from the synthesis gas feed. Further, the process as usually operated produces no or virtually no aromatic components. The aromatics content of a Fischer-Tropsch gas oil, as determined for instance by ASTM D4629, will typically be below 1% w/w, preferably below 0.5% w/w and more preferably below 0.1% w/w.

The Fischer-Tropsch derived gas oil used in the present invention will typically have a density from 0.75 to 0.79 g/cm$^3$ at 15° C.; a cetane number (ASTM D613) greater than 55, suitably from 64 to 85; a kinematic viscosity (ASTM D445) from 2 to 4.5, preferably 2.5 to 4.0, more preferably from 2.9 to 3.7 mm$^2$/s at 40° C.; and a sulfur content (ASTM D5453) of 5 ppmw (parts per million by weight) or less, preferably of 2 ppmw or less.

Preferably it is a product prepared by a Fischer-Tropsch methane condensation reaction using a hydrogen/carbon monoxide ratio of less than 2.5, preferably less than 1.75, more preferably from 0.4 to 1.5, and ideally using a cobalt containing catalyst. Suitably it will have been obtained from a hydrocracked Fischer-Tropsch synthesis product (for instance as described in GB-B-2077289 and/or EP-A-0147873), or more preferably a product from a two-stage hydroconversion process such as that described in EP-A-0583836 (see above). In the latter case, preferred features of the hydroconversion process may be as disclosed at pages 4 to 6, and in the examples, of EP-A-0583836.

For component (c), certain fatty acid alkyl esters predominantly (or principally) having 18 carbon atoms with 1 or 2 double bonds with a ratio of C18:2 to C18:1 of 1.5 to 2.8, more preferably 1.8 to 2.5 provides a synergistic effect with component (a) and (b) to provide enhanced thermal stability in a diesel fuel application. Fatty acids are represented by a notation C18:2 for the fatty acid having 18-carbon chain and 2 double bonds. Fatty acids are represented by a notation C18:1 for the fatty acid having 18-carbon chain and 1 double bond. Examples of fatty acid esters with a ratio of C18:2 to C18:1 of 1.5 to 2.8 includes soy esters, corn esters, cottonseed esters, walnut esters, sunflower esters and pumpkin esters or any renewable-sourced fatty acid ester with C18:2 to C18:1 within the defined range. Examples of fatty acid esters with ratio of C18:2 to C18:1 of 1.8 to 2.5 includes soy esters, corn esters, cottonseed esters, and walnut esters. Preferably the alkyl group has a carbon number from 1 to 4. Most preferably the fatty acid alkyl esters are methyl esters. In contrast, typical C18:2 to C18:1 ratio of a rapeseed methyl ester is about 0.56. The fatty acid composition of these fatty acid alkyl esters can be determined by gas-liquid chromatograph and the intramolecular distribution of the acids can be studied using pancreatic lipase to remove selectively the fatty acids esterified to the primary alcoholic groups. British Standards EN14103 can be used to determine fat and oil derivatives for fatty acid methyl esters (FAME).

The fuel composition may also contain a number of conventional additives, such as for example detergent additive, dehazing additive, static dissipater additive/conductivity improver, corrosion improver, lubricity improver, cetane improver and the like for use in diesel fuels in amounts required to provide various functions and meet regulations. The base fuel is typically present in an amount of 95% or greater in the fuel composition, preferably 97%, more preferably 99% or greater in the fuel composition.

By "dehazing additive" is meant a reagent, or a formulation containing such a reagent, which is suitable for inclusion in a fuel composition (in particular a diesel fuel composition) and which has the effect of improving the dehazing performance of that composition. Known dehazing fuel additives include alkoxylated phenol formaldehyde polymers such as those commercially available as NALCO™ EC5462A (formerly 7D07) (ex Nalco) and TOLAD™ 2683 (ex Petrolite).

By "detergent additive" is meant a detergent, or a formulation containing a detergent, suitable for inclusion in a fuel composition, in particular a diesel fuel composition. A detergent is an agent (suitably a surfactant) which can act to remove, and/or to prevent the build up of, combustion related deposits within a fuel combustion system, in particular in the fuel injection system of an engine such as in the injector nozzles. Such materials are sometimes referred to as dispersant additives.

Examples of known detergents include polyolefin substituted succinimides or succinamides of polyamines, for instance polyisobutylene succinimides or polyisobutylene amine succinamides, aliphatic amines, Mannich bases or reaction products of amines and polyolefin (eg, polyisobutylene) maleic anhydrides. Succinimide dispersant additives are described for example in GB-A-960493, EP-A-0147240, EP-A-0482253, EP-A-0613938, EP-A-0557516 and WO-A-98/42808. Detergent-containing diesel fuel additives are known and commercially available for instance from Infineum (eg, F7661 and F7685), Octel (eg, OMA 4130D) and Lubrizol (eg, the Lz8043 series).

Where a diesel fuel composition includes a detergent, typical concentrations lie in the range 20 to 500 ppmw active matter detergent based on the overall fuel composition, more preferably 40 to 500 ppmw, most preferably 40 to 300 ppmw or 100 to 300 ppmw or 150 to 300 ppmw. In the context of the present invention, however, preferred concentrations may be 400 ppmw or less, more preferably 300 ppmw or less, yet more preferably 200 or 100 ppmw or less, most preferably 50 ppmw or 20 ppmw or less, such as from 10 to 100 ppmw or from 10 to 50 ppmw, active matter detergent based on the overall fuel composition. Any detergent additives present are preferably incorporated at levels no higher than, preferably lower than, more preferably 0.8 times or less, yet more preferably 0.5 times or less, their standard recommended single treat rate(s). Still more preferably, as described above, the fuel composition contains no detergents.

The thermal stability properties of a fuel composition may be assessed with ASTM D3241, the STM for thermal oxidative stability by the Jet Fuel Thermal Oxidation Stability Tester (JFTOT) procedure. Thus, an improvement in thermal stability properties may be manifested by a reduction in tube rating of 1 or less.

Preferably the components (a), (b) and (c) are used in an amount effective to achieve passing fuel oxidation stability having deposit level of less than 3 according to JFTOT.

The concentration of component (a) is 90 to 50% by volume based on the base fuel, preferably about 90 to about 80% by volume. The concentration of component (b) is 5 to 25% by volume based on the base fuel, preferably about 5 to about 10% by volume. The concentration of component (c) is 5 to 25% by volume based on the base fuel, preferably about 5 to about 10% by volume. The base fuel can be prepared by blending components (a), (b) and (c) in any order.

Any additional fuel component(s) in the composition may be fuels of conventional type. They, and ideally also the overall fuel composition, are preferably low or ultra low sulfur fuels, or sulfur free fuels, for instance containing at most 500 ppmw, preferably no more than 350 ppmw, most preferably no more than 100 or 50 ppmw, or even 15 ppmw or less, or 10 ppmw or less, of sulfur.

Generally speaking, Fischer-Tropsch derived fuels have relatively low levels of polar components, in particular polar surfactants, for instance compared to petroleum derived fuels.

Where the Fischer-Tropsch derived fuel is a kerosene fuel, it will be a liquid hydrocarbon middle distillate fuel with a distillation range suitably from about 150 to 250° C. or from about 150 to 200° C. It will have a final boiling point of typically from 190 to 260° C., for instance from 190 to 210° C. for a typical "narrow-cut" kerosene fraction or from 240 to 260° C. for a typical "full-cut" fraction. Its initial boiling point is preferably from 140 to 160° C. Again, Fischer-Tropsch derived kerosenes tend to be low in undesirable fuel components such as sulfur, nitrogen and aromatics.

A Fischer-Tropsch derived kerosene fuel preferably has a density of from 0.730 to 0.760 g/cm$^3$ at 15° C.—for instance from 0.730 to 0.745 g/cm$^3$ for a narrow-cut fraction and from 0.735 to 0.760 g/cm$^3$ for a full-cut fraction, and/or a sulfur content of 5 ppmw or less. It is preferably the product of a SMDS process, preferred features of which may be as described above in connection with Fischer-Tropsch gas oils.

In accordance with the present invention, more than one Fischer-Tropsch derived fuel of the types described above may be used in a fuel composition.

The present invention may be applicable where the fuel composition is suitable for, and/or intended for, use in any system which can be powered by or otherwise consume a fuel, in particular a diesel fuel, composition. In particular it may be suitable, and/or intended, for use in an internal or external (preferably internal) combustion engine, more particularly for use as an automotive fuel and most particularly for use in an internal combustion engine of the compression ignition (diesel) type. Such a diesel engine may be of the direct injection type, for example of the rotary pump, in-line pump, unit pump, electronic unit injector or common rail type, or of the indirect injection type. It may be a heavy or a light duty diesel engine.

Where the fuel composition is such an automotive diesel fuel composition, it preferably falls within applicable current standard specification(s) such as for example ASTM D975-09, ASTM D7467, or EN590:2004 (or 2009). It suitably has a density from 0.82 to 0.845 g/cm$^3$ at 15° C.; a final boiling point T90 (ASTM D86) of 338° C. or less or T95 (ASTM D86) of 360° C. or less; a cetane number (ASTM D613) of 40 or greater; a kinematic viscosity (ASTM D445) from 2 to 4.5 centistokes (mm$^2$/s) at 40° C.; a sulfur content (ASTM D2622) of 500 ppm mass or less; and/or a total aromatics content (IP 391(mod)) of less than 35% vol total.

The fuel composition may be suitable for, and/or intended for, use as an industrial gas oil, for instance for use in a heating or other fuel combustion system.

Generally speaking, and subject to the desire to reduce additive levels by using components (a) (b) and (c), in the context of the present invention any fuel component or fuel composition may be additivated (additive containing) or unadditivated (additive free). Such additives may be added at various stages during the production of a fuel composition; in the case of automotive fuels those added to a base fuel at the refinery for example might be selected from anti-static agents, pipeline drag reducers, flow improvers (e.g., ethylene/vinyl acetate copolymers or acrylate/maleic anhydride copolymers) and wax anti-settling agents (e.g., those commercially available under the Trade Marks "PARAFLOW" (e.g., PARAFLOW™ 450, ex Infineum), "OCTEL" (e.g., OCTEL™ W 5000, ex Octel) and "DODIFLOW" (e.g., DODIFLOW™ v 3958, ex Hoechst).

Thus if the fuel composition contains additives, they will typically although not necessarily be incorporated together with one or more of the constituent fuel components (including the Fischer-Tropsch derived component), whether at or downstream of the refinery. Suitably however the composition will contain only a minor proportion (preferably less than 1% w/w, more preferably less than 0.5% w/w (5000 ppmw) and most preferably less than 0.2% w/w (2000 ppmw)) of any such fuel additives.

Components which may be incorporated in fuel additives, in particular for use in diesel fuels, include lubricity enhancers such as EC 832 and PARADYNE™ 655 (ex Infineum), HITEC™ E580 (ex Ethyl Corporation) and VEKTRON™ 6010 (ex Infineum) and amide based additives such as those available from the Lubrizol Chemical Company, for instance LZ 539 C; ignition improvers (cetane improvers) (eg, 2-ethylhexyl nitrate (EHN), cyclohexyl nitrate, di-tert-butyl peroxide and those disclosed in U.S. Pat. No. 4,208,190 at column 2, line 27 to column 3, line 21); anti-rust agents (eg, that sold commercially by Rhein Chemie, Mannheim, Germany as "RC 4801", a propane-1,2-diol semi-ester of tetrapropenyl succinic acid, or polyhydric alcohol esters of a succinic acid derivative, the succinic acid derivative having on at least one of its alpha carbon atoms an unsubstituted or substituted aliphatic hydrocarbon group containing from 20 to 500 carbon atoms, eg, the pentaerythritol diester of polyisobutylene-substituted succinic acid); corrosion inhibitors; reodorants; anti-wear additives; anti-oxidants (eg, phenolics such as 2,6-di-tert-butylphenol, or phenylenediamines such as N,N'-di-sec-butyl-p-phenylenediamine); and metal deactivators.

The (active matter) concentration of any ignition improver present will preferably be 600 ppmw or less, more preferably 500 ppmw or less, conveniently from 300 to 500 ppmw.

In another embodiment of the invention, a method is provided for improving thermal stability of a diesel fuel run or operated in a diesel engine by using a diesel fuel composition comprising a base fuel containing:
(a) 90 to 50% by volume based on the base fuel, of a petroleum refined diesel fuel having sulfur level of less than 500 ppm, and boiling point within the range of about 150 to about 400° C.;
(b) 5 to 25% by volume based on the base fuel, a Fischer-Tropsch derived gas oil; and
(c) 5 to 25% by volume based on the base fuel, a fatty acid alkyl ester having C18:2 to C18:1 ratio of 1.5 to 2.8 wherein the alkyl group has a carbon number from 1 to 4.

The present invention will be further understood from the following examples, which illustrate the oxidative stability of the blends containing components (a), (b) and (c) in diesel engines.

While the invention is susceptible to various modifications and alternative forms, specific embodiments thereof are shown by way of examples herein described in detail. It should be understood, that the detailed description thereto are not intended to limit the invention to the particular form disclosed, but on the contrary, the intention is to cover all modifications, equivalents and alternatives falling within the spirit and scope of the present invention as defined by the appended claims. The present invention will be illustrated by the following illustrative embodiment, which is provided for illustration only and is not to be construed as limiting the claimed invention in any way.

ILLUSTRATIVE EXAMPLES

The Jet Fuel Thermal Oxidation Stability Tester (JFTOT) was used to evaluate the oxidative and thermal stability of diesel fuel blends described below under high temperature conditions. The procedure details a method for heating and filtering a hydrocarbon liquid over a period of 2.5 hours under approximately 500 psig pressure. The temperature used is based on the specifications of the aviation fuel. For example, according to ASTM D 1655-07 Jet A should be tested at 260° C. with the JFTOT procedure. In contrast, JP-7 (MIL-T-38219B) should be tested at 355° C. Research applications use any temperatures within the range of about 200° C. to about 400° C. that will facilitate discrimination between two or more samples. The air-saturated hydrocarbon is pumped over a heated tube and then through a filter. Hydrocarbonaceous deposits form on the heated tube and these are visually assessed according to the ASTM color standard (Adjunct No. 12-416600-00) at the conclusion of the test. A rating less than Deposit Code 3 is required in order for many aviation fuels to pass one of several aviation fuel specifications.

TABLE 1

| Deposit Code | Appearance |
| --- | --- |
| 0 | No visible deposits |
| 1 | Haze or dulling, no color |
| 2 | Barely visible discoloration |
| 3 | Light tan |
| 4 | Heavier than code 3 |

During the test, suspended particulates in the fuel stream are also trapped on the filter and filtered from the flowing hot liquid. In some extreme cases, the filter can become clogged with suspended particles. The pressure drop across the filter is measured and when it reaches a certain maximum value, the product is also considered to fail and the test is concluded.

Ultra low sulfur diesel (ULSD) from Motiva Port Arthur refinery, a petroleum refined diesel fuel, and Fisher-Tropsch derived gas oil from Shell Bintulu refinery summer grade production and soy methyl ester purchased in the United States of America were used. Properties of the ULSD, soy methyl ester and F-T-derived gas oil are provided below.

TABLE 2

| | Test Method | Unit | Petroleum Refined Diesel Fuel | Soy Methyl Ester | F-T derived Gasoil |
| --- | --- | --- | --- | --- | --- |
| K. Vis, 40 C. | D 445 | cSt | 2.06 | 4.07 | 3.63 |
| Sulfur | D5453 | ppmw | 2 | N.A. | 0.6 |
| Cetane Number | D613 | — | 47.3 | 48.3 | >76 |
| Oxidation Stability | EN14112 | Hrs | — | 4.8 | — |
| | D2274 | Fil, Adh, Total Insol | <0.1, <0.1, <0.1 | — | 0.1, 0.5, 0.6 |
| Density, 15° C. | D4052 | g/cm$^3$ | 0.8330 | 0.884 | 0.7855 |
| Distillation, T90 | D1160 D86 | ° C. | 300.2 | 356.1 | 340.6 |

It has been found that a typical Ultra-Low Sulfur Diesel (ULSD) will produce a maximum level of deposits (>4) when tested in the JFTOT procedure at 320° C. Similarly, neat Soy Methyl Ester (SME) provides a level of deposits of 3.5 at 320° C. Substituting some of the (ULSD) with 5% by volume of Fischer-Tropsch derived gas oil (GTL) also affords a deposit level of >4. Therefore all three components produce a failing rating by JFTOT at 320° C.

Surprisingly, a mixture of 90 volume % ULSD, 5% GTL and 5% SME afforded a passing rate of 2. Similarly, varying the concentrations of ULSD, SME and GTL in a blend where ULSD is the major component and GTL and SME are the minor components, also affords passing ratings that are less than 2 (FIG. 1). These results indicate that the SME is synergistically reducing the deposit-forming tendency of ULSD, or ULSD/GTL mixtures. These results are surprising in that SME and other fatty acid methyl esters are considered oxidatively unstable materials. Without being limited to a particular mechanism, it may be that under the right conditions of temperature and composition, SME molecules, or polar components or degradation products from the SME, can act as surface-active components in mixed blends to maintain cleanliness of surfaces subject to deposits from hydrocarbons fuels. For example, SME components may stabilize and disperse any nascent deposit-forming material in the hydrocarbon fluid, or they may passivate metal surfaces toward deposition, or modify the adhesiveness of deposits as they form.

The blends were tested with ULSD/SME/GTL vol. % as follows and results shown in FIG. 1. Example 1 (100/0/0), Example 2 (90/0/10), Example 3 (90/5/5), Example 4 (75/20/5), Example 5 (70/20/10), Example 6 (60/30/10), Example 7 (50/25/25), Example 8 (0/100/0).

In the examples in FIG. 1, tubes were rated on the scale 0, <1, 1, <2, 2, <3, 3, <4, 4 and >4. For ease of graphing, values that are "less than" or "more than" have been assigned half values, i.e. <3=2.5.

Example 9 and Comparative Example

Components were obtained and two, three-component blends were made.

Example 9 was composed of: 90% vol US ULSD/5% vol US SME FAME/5% vol GTL Fuel. The US ULSD was a CARB ULSD ex Shell Martinez Refinery, manufactured as a nominal 46 cetane number, sub 10% aromatics, sub 15 ppm sulfur diesel fuel. The US SME (soy methyl ester biodiesel) FAME was typical of what is available in the US market from soy beans. The GTL Fuel was from a sample of Shell Bintulu Summer Grade production.

The comparative example according to U.S. Pat. No. 7,189,265 was composed of: 90% vol ULSD/5% vol RME FAME/5% vol GTL Fuel. The ULSD was a ZSD (zero sulfur diesel) with a 10 ppm sulfur level (which is designated by convention as a ZSD). The RME (rapeseed methyl ester biodiesel) FAME is typical of what is available in the UK/EU. Again, the GTL Fuel was from a sample of Shell Bintulu Summer Grade production.

These ternary blends of ULSD/FAME/GTL Fuel were tested with thermal stability tests per ASTM D3241, the STM for thermal oxidative stability by JFTOT procedure. Tube deposits and increased pressure drop correlate to fuel system deposit potential.

Testing was run (in duplicate) at 300 deg C., 320 deg C., and 330 deg C. to determine deposits laid down on an inductively heated tube from thermal instability. Tube deposits are visually rated on a scale from 0 (good—clean) to 4 (bad—dirty).

As the test proceeds deposits on the tube are responsible for increased pressure drop (in minutes). Results were as follows:

| Ex 9 | | | | | |
|---|---|---|---|---|---|
| T, deg C. | 300 | 320 | 320 | 330 | 330 |
| Tube rating | 1 | 1 | 1 | 1 | 1 |
| Delta P | 1 | 1 | 0 | 1 | 1 |
| Time (to 25 mmHg) | — | — | — | — | — |
| Volume, mL | >475 | >475 | >475 | >475 | 475 |
| Comparative Ex | | | | | |
| T, deg C. | 300 | 300 | 320 | 320 | 330 |
| Tube Rating | >4 | >4 | >4 | >4 | >4 |
| Delta P | >25 | 24 | >25 | >25 | >25 |
| Time (to 25 mmHg) | 125 | — | 71 | 83 | 54 |
| Volume, mL | >475 | 500 | 500 | >475 | >475 |

The results from Example 9 were rather clean heater tubes, with no increase in pressure drop. The blend according to the invention is very thermally stable.

The comparative blend results were poor, with very dirty heater tubes and marked increase in pressure drop. The comparative blend is quite thermally unstable.

In all cases, the examples according to the invention containing USLD/SME/GTL blend exhibited much better (lower) levels of tube deposits and pressure drop than the comparative example blend of USLD/RME/GTL described in U.S. Pat. No. 7,189,265. Therefore, the examples according to the invention containing USLD/SME/GTL is much more thermally stable than the comparative components.

We claim:

1. A fuel composition comprising a base fuel consisting essentially of:
    (a) 90 to 50% by volume based on the base fuel, of a petroleum refined diesel fuel having sulfur level of less than 500 ppm, and boiling point within the range of about 150 to about 400° C.;
    (b) 5 to 25% by volume based on the base fuel, a Fischer-Tropsch derived gas oil; and
    (c) 5 to 25% by volume based on the base fuel, a fatty acid alkyl ester having C18:2 to C18:1 ratio of 1.5 to 2.8 wherein the alkyl group has a carbon number from 1 to 4.

2. The fuel composition of claim 1 wherein the C18:2 to C18:1 ratio in component (c) is 1.8 to 2.5.

3. The fuel composition of claim 2 wherein the fatty acid alkyl ester is a fatty acid methyl ester.

4. The fuel composition of claim 1 wherein the fatty acid alkyl ester is selected from a group consisting of a soy ester, corn ester, cottonseed ester, walnut ester, sunflower ester, pumpkin ester and a mixture thereof.

5. The fuel composition of claim 2 wherein the fatty acid alkyl ester is selected from a group consisting of a soy ester, corn ester, cottonseed ester, walnut ester, and a mixture thereof.

6. The fuel composition of claim 5 wherein the fatty acid alkyl ester is soy ester.

7. The fuel composition of claim 6 wherein the fatty acid alkyl ester is a soy methyl ester.

8. The fuel composition of claim 2 wherein the petroleum refined diesel fuel has a sulfur level of less than 15 ppm.

9. The fuel composition of claim 1 wherein the base fuel is present in the fuel composition in an amount of at least 95% by weight.

10. The fuel composition of claim 2 wherein the base fuel is present in the fuel composition in an amount of at least 99% by weight.

11. The fuel composition of claim 4 wherein the base fuel is present in the fuel composition in an amount of at least 95% by weight.

12. The fuel composition of claim 5 wherein the base fuel is present in the fuel composition in an amount of at least 95% by weight.

13. The fuel composition of claim 12 wherein the base fuel is present in the fuel composition in an amount of at least 99% by weight.

14. A method for improving thermal stability of a diesel fuel run or operated in a diesel engine by using a diesel fuel composition comprising a base fuel comprising:
 (a) 90 to 50% by volume based on the base fuel, of a petroleum refined diesel fuel having sulfur level of less than 500 ppm, and boiling point within the range of about 150 to about 400° C.;
 (b) 5 to 25% by volume based on the base fuel, a Fischer-Tropsch derived gas oil; and
 (c) 5 to 25% by volume based on the base fuel, a fatty acid alkyl ester having C18:2 to C18:1 ratio of 1.5 to 2.8 wherein the alkyl group has a carbon number from 1 to 4.

15. The method of claim 14 wherein the C18:2 to C18:1 ratio in component (c) is 1.8 to 2.5.

16. The method of claim 15 wherein the fatty acid alkyl ester is a fatty acid methyl ester.

17. The method of claim 14 wherein the fatty acid alkyl ester is selected from a group consisting of a soy ester, corn ester, cottonseed ester, walnut ester, sunflower ester, pumpkin ester and a mixture thereof.

18. The method of claim 15 wherein the fatty acid alkyl ester is selected from a group consisting of a soy ester, corn ester, cottonseed ester, walnut ester, and a mixture thereof.

19. The method of claim 18 wherein the fatty acid alkyl ester is soy ester.

20. The method of claim 19 wherein the fatty acid alkyl ester is a soy methyl ester.

21. A method of preparing a diesel fuel comprising blending
 (a) 90 to 50% by volume based on the base fuel, of a petroleum refined diesel fuel having sulfur level of less than 500 ppm, and boiling point within the range of 150 to 400° C.;
 (b) 5 to 25% by volume based on the base fuel, a Fischer-Tropsch derived gas oil; and
 (c) 5 to 25% by volume based on the base fuel, a fatty acid alkyl ester having C18:2 to C18:1 ratio of 1.5 to 2.8 wherein the alkyl group has a carbon number from 1 to 4.

* * * * *